US 11,261,979 B2

(12) United States Patent
Soltau et al.

(10) Patent No.: US 11,261,979 B2
(45) Date of Patent: Mar. 1, 2022

(54) CHECK VALVE PIVOT PIN RETAINER SEAL

(71) Applicant: FMC Technologies, Inc., Houston, TX (US)

(72) Inventors: James R. Soltau, Stephenville, TX (US); Cody Bedwell, Houston, TX (US); Dusty Quinn, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 17/175,377

(22) Filed: Feb. 12, 2021

(65) Prior Publication Data

US 2021/0254731 A1  Aug. 19, 2021

Related U.S. Application Data

(60) Provisional application No. 62/977,221, filed on Feb. 15, 2020.

(51) Int. Cl.
*F16K 15/03* (2006.01)
*F16K 31/528* (2006.01)

(52) U.S. Cl.
CPC .......... *F16K 15/03* (2013.01); *F16K 31/5282* (2013.01); *Y10S 277/91* (2013.01); *Y10T 137/7898* (2015.04)

(58) Field of Classification Search
CPC .................. F16K 31/5282; F16K 15/03; Y10T 137/7898–7902; Y10S 277/91
USPC .................................................. 251/298–303
See application file for complete search history.

(56) References Cited

U.S. PATENT DOCUMENTS

| | | | | | |
|---|---|---|---|---|---|
| 1,635,842 | A | * | 7/1927 | Hirshstein | F16K 15/03 137/527.2 |
| 2,358,101 | A | * | 9/1944 | Randall | F16K 17/16 137/70 |
| 2,589,176 | A | * | 3/1952 | Wheatley | F16K 15/03 137/269.5 |

(Continued)

FOREIGN PATENT DOCUMENTS

CA  3024858 A1 * 11/2017 ............... F16K 1/44

*Primary Examiner* — Daphne M Barry
*Assistant Examiner* — Frederick D Soski
(74) *Attorney, Agent, or Firm* — Osha Bergman Watanabe & Burton LLP

(57) ABSTRACT

Embodiments relate to a check valve and methods of making a check valve that include a valve body having an inlet end, an outlet end, a flow bore that extends between the inlet and outlet ends, a cavity which intersects the flow bore, and an opening which is connected to the cavity. In certain embodiments, the check valve further includes a cap removably secured in the opening, a seat cartridge disposed in the cavity, wherein the seat cartridge comprises a chamber with a flow bore, a retainer ring positioned in the valve body between the cap and the seat cartridge, a pivot pin retainer seal provided between the retainer ring and the valve body, wherein the pivot pin retainer seal comprises one or more protrusions extending outwardly in a radial direction from the retainer ring to seal on the valve body, and a flapper pivotally connected to the retainer ring, wherein the flapper is pivotable through the chamber between a closed position in which the flapper is positioned against a shoulder in the seat cartridge and an open position in which the flapper is displaced from the shoulder.

17 Claims, 5 Drawing Sheets

(56) References Cited

U.S. PATENT DOCUMENTS

| | | | | |
|---|---|---|---|---|
| 2,874,927 A * | 2/1959 | Conrad | E21B 47/117 | 251/100 |
| 2,928,416 A * | 3/1960 | Balhouse | F16K 15/03 | 137/527.8 |
| 2,952,438 A * | 9/1960 | Conrad | E21B 34/12 | 251/348 |
| 3,016,914 A * | 1/1962 | Keithahn | E21B 21/10 | 137/515 |
| 3,075,547 A * | 1/1963 | Scaramucci | F16K 15/03 | 137/516.29 |
| 3,106,220 A * | 10/1963 | Hose | F16K 15/1821 | 137/514 |
| 3,366,137 A * | 1/1968 | Hansen | F16K 15/03 | 137/527.4 |
| 3,805,828 A * | 4/1974 | Panagrossi | F16K 15/03 | 137/855 |
| 3,817,277 A * | 6/1974 | Wheatley | F16K 15/03 | 137/515.7 |
| 3,875,963 A * | 4/1975 | Buck | F16K 15/03 | 137/527.8 |
| 3,926,216 A * | 12/1975 | Rulcker | F16K 15/033 | 137/527.8 |
| 4,094,516 A * | 6/1978 | Morley | F16J 15/34 | 277/380 |
| 4,128,111 A * | 12/1978 | Hansen | F16K 15/03 | 137/515.7 |
| 4,134,455 A * | 1/1979 | Read | E21B 34/12 | 166/334.1 |
| 4,164,958 A * | 8/1979 | Jaconette | F16K 15/03 | 137/527 |
| 4,308,894 A * | 1/1982 | Carpentier | F16K 15/03 | 137/630.15 |
| 4,323,287 A * | 4/1982 | Stella | F16C 13/006 | 384/484 |
| 4,353,390 A * | 10/1982 | Karpenko | F16K 15/03 | 137/527.8 |
| 4,556,226 A * | 12/1985 | Ito | H01R 13/5219 | 277/615 |
| 4,618,824 A * | 10/1986 | Magee | F16K 15/03 | 137/554 |
| 5,149,107 A * | 9/1992 | Maringer | F16J 15/3208 | 277/556 |
| 5,213,306 A * | 5/1993 | Lageder | F16K 1/2028 | 251/48 |
| 5,400,995 A * | 3/1995 | Boyd | A61M 5/1415 | 248/407 |
| D379,493 S * | 5/1997 | Woods | D23/269 | |
| 5,678,829 A * | 10/1997 | Kalsi | F16J 15/3244 | 277/559 |
| 5,862,864 A * | 1/1999 | Whiteford | E21B 34/101 | 166/321 |
| 6,105,968 A * | 8/2000 | Yeh | F16J 15/3412 | 277/399 |
| 6,126,206 A * | 10/2000 | Topf, Jr. | F16L 55/163 | 138/97 |
| D437,034 S * | 1/2001 | Stout, Jr. | D23/269 | |
| D447,223 S * | 8/2001 | Mattsson | D23/269 | |
| 7,134,671 B2 * | 11/2006 | Duke | F16J 15/3236 | 277/560 |
| 9,581,199 B2 * | 2/2017 | Tanaka | F16H 7/1281 | |
| 9,816,628 B2 * | 11/2017 | Parameshwaran | F16K 1/2035 | |
| D834,156 S * | 11/2018 | Soria | D23/269 | |
| 10,612,345 B2 * | 4/2020 | Bayh, III | F16K 1/2014 | |
| 10,794,143 B2 * | 10/2020 | Hair | E21B 34/06 | |
| 10,890,265 B2 * | 1/2021 | Fink | F16K 27/0227 | |
| 11,098,821 B1 * | 8/2021 | Nguyen | F16K 15/03 | |
| 2003/0209862 A1 * | 11/2003 | Keene | E21B 33/1212 | 277/607 |
| 2005/0139266 A1 * | 6/2005 | Partridge | F16K 15/03 | 137/527.8 |
| 2006/0163520 A1 * | 7/2006 | Shakagori | F16K 1/2265 | 251/359 |
| 2007/0272308 A1 * | 11/2007 | Spears | F16K 15/03 | 137/527.8 |
| 2008/0308159 A1 * | 12/2008 | Stunkard | F16K 15/03 | 137/315.33 |
| 2013/0000745 A1 * | 1/2013 | Witkowski | F16K 15/03 | 137/15.18 |
| 2016/0010756 A1 * | 1/2016 | Fallon | F16K 27/0227 | 137/12 |
| 2018/0209555 A1 * | 7/2018 | Fink | F16K 15/03 | |
| 2018/0238459 A1 * | 8/2018 | Nowell | F16K 15/03 | |
| 2018/0363789 A1 * | 12/2018 | Nguyen | F16K 15/03 | |
| 2021/0095772 A1 * | 4/2021 | Partridge | F16K 27/0227 | |
| 2021/0254731 A1 * | 8/2021 | Soltau | F16K 15/03 | |

* cited by examiner

CHECK VALVE PIVOT PIN RETAINER SEAL

FIELD OF DISCLOSURE

Embodiments disclosed herein relate generally to subsea oil and gas stimulation (frac) equipment. More particularly, embodiments disclosed herein relate to a check valve with a flapper for controlling fluid flow through a valve block.

BACKGROUND

Check valves may be a two-port valve having two openings in the body. For example, one opening may be for fluid to enter and the other opening may be for fluid to exit. There are various types of check valves used in a wide variety of applications. For example, a swing check valve may be a check valve in which a movable part swings on a hinge, either onto the seat to block reverse flow or off the seat to allow forward flow. The seat opening cross-section may be perpendicular to the centerline between the two ports or at an angle. Although swing check valves can come in various sizes, large check valves are often swing check valves. As shown by FIG. 1, a conventional check valve 10 includes a valve body 12 having first and second ends 14, 16 which are configured to be connected to flow pipes or other flow components (not shown) by suitable means, such as wing unions (not shown) or other high pressure connections. The valve body 12 includes a flow bore 20 which extends between the first and second ends 14, 16, and a larger diameter cavity 22 which is formed coaxially within the flow bore. The cavity 22 is accessible through a top opening 24 in the valve body 12 which is closed by a removable body cap 26 that is threaded into the top opening and is sealed to the valve body by a ring seal 28. Additionally, the conventional check valve 10 include a flapper 30 which is pivotally connected by a pivot pin 32 to a retainer ring 34. The retainer ring 34 is received in a corresponding pocket 36 which is formed in the valve body 12 between the top opening 24 and the cavity 22 and is secured therein by the body cap 26. The flapper 30 includes a sealing side 38 which is configured to seal against a cylindrical valve seat 40. In this example, the sealing side 38 is coated with a resilient material, such as a urethane, in order to enhance the sealing capability of the flapper 30. The valve seat 40, which has a through bore 42 of approximately the same diameter as the flow bore 20, is received in a corresponding counterbore 44 in the valve body 12 and is sealed thereto by a pair of ring seals 46, 48. Both the retainer ring 34 and the valve seat 40 are maintained in their proper orientation in the cavity 22 by an alignment pin 50 which extends through a corresponding hole in the retainer ring and into a matching hole in the valve seat. A non-limiting example of check valves may be described in U.S. Patent Publication No. 2019/0293193, the entire teachings of which are incorporated herein by reference.

A common issue caused in the conventional check valves is known as water hammer. This can occur when the conventional check valve closes and the flow abruptly stops, causing a surge of pressure resulting in high velocity shock waves that act against the piping and valves, placing large stress on the metals and vibrations in the system. Undetected, water hammer can rupture pumps, valves, and pipes within the system. Additionally, flow may cause erosion inside the body of the conventional check valves. The erosion may cause sand and other materials to get stuck within and in-between various components inside the body of the conventional check valves. Further, sand and other materials may cause the various components of the conventional check valve to jam and cause the pressure build-up.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, one or more embodiments disclosed herein relate to a check valve that includes a valve body which includes an inlet end, an outlet end, a flow bore that extends between the inlet and outlet ends, a cavity which intersects the flow bore, and an opening which is connected to the cavity. In certain embodiments, the check valve further includes a cap removably secured in the opening, a seat cartridge disposed in the cavity, wherein the seat cartridge comprises a chamber with a flow bore, a retainer ring positioned in the valve body between the cap and the seat cartridge, a pivot pin retainer seal provided between the retainer ring and the valve body, wherein the pivot pin retainer seal comprises one or more protrusions extending outwardly in a radial direction from the retainer ring to seal on the valve body, and a flapper pivotally connected to the retainer ring, wherein the flapper is pivotable through the chamber between a closed position in which the flapper is positioned against a shoulder in the seat cartridge and an open position in which the flapper is displaced from the shoulder.

In another aspect, one or more embodiments disclosed herein relate to a method of assembling a check valve.

Other aspects and advantages will be apparent from the following description and the appended claims.

DETAILED DESCRIPTION

Figure 1:
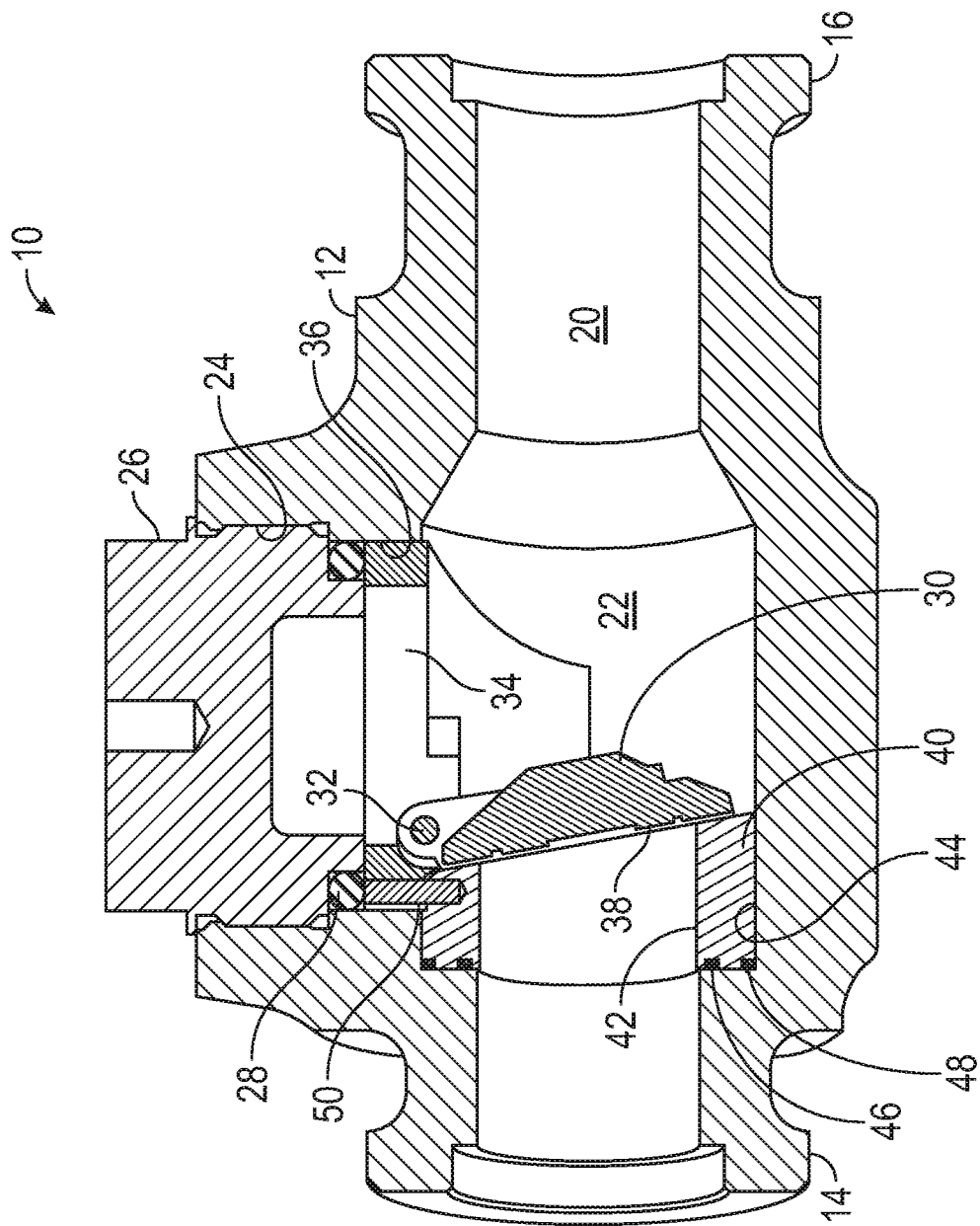
FIG. 1 is a longitudinal cross sectional view of a check valve in accordance with the prior art.

Embodiments of the present disclosure are described below in detail with reference to the accompanying figures.

Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Further, embodiments disclosed herein are described with terms designating a check valve reference to a valve body with at least one flapper in a flow bore that controls and regulates the flow of fluids. As used herein, fluids may refer to slurries, liquids, gases, and/or mixtures thereof. In addition, any terms designating check valves that may be used at any rig type (i.e., any land rig or offshore rig) should not be deemed to limit the scope of the disclosure. It is to be further understood that the various embodiments described herein may be used in various stages of a well, such as rig site preparation, drilling, completion, abandonment etc., and in other environments, such as work-over rigs, fracking installation, well-testing installation, oil and gas production installation, without departing from the scope of the present disclosure. It is recognized by the different embodiments described herein that a check valve plays a valuable and useful role in the life of a well. Further, it is recognized that the fluid flow configuration and arrangement of components for a check valve according to one or more embodiments described herein may provide a cost effective alternative to conventional check valves. The embodiments are described merely as examples of useful applications, which are not limited to any specific details of the embodiments herein.

In one aspect, embodiments disclosed herein relate to a pivot pin retainer seal, such as a seal around a pivot pin retainer for a flapper that may be used in a check valve, for example. As used herein, the term "coupled" or "coupled to" or "connected" or "connected to" "attached" or "attached to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Figure 2A:
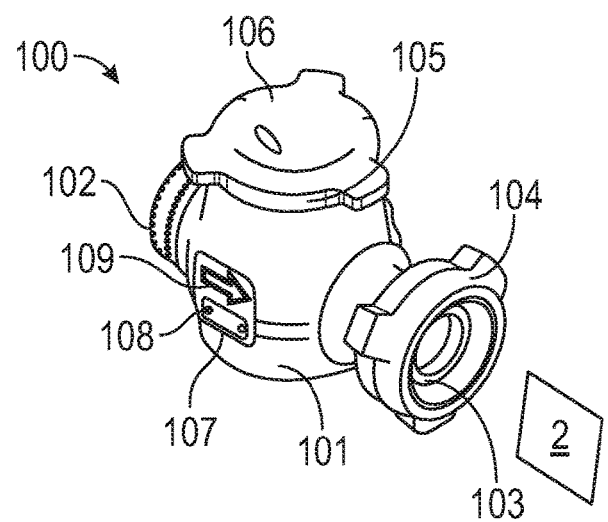
FIG. 2A is a perspective view of a check valve in accordance with one or more embodiments of the present disclosure

Turning to FIG. 2A, FIG. 2A shows a perspective view of a check valve 100 in accordance with one or more embodiments of the present disclosure. In one or more embodiments, the check valve 100 is an assembly of one or more tubulars, valves, and other components that may be configured to operate in conjunction with flow manifolds in oil and gas operations. FIG. 2A is a simplified elevation view and one of ordinary skill will understand that additional components may be added or used in conjunction with the check valve 100 shown in FIG. 2A. In one or more embodiments, the check valve 100 may have a valve body 101 having an inlet end 102 and an outlet end 103. In a non-limiting example, the valve body 101 may be made of metal such as steel, iron, treated iron, or any metal alloy. The inlet end 102 and the outlet end 103 may be connected to flow pipes or other flow components (not shown) by connectors, such as a nut 104 or other high pressure connections. Those of ordinary skill in the art will appreciate that there are many techniques and methods which may be used to connect the check valve 100 to temporary hydraulic fracturing lines or other well components that may be applicable to the embodiments described herein, including, using a wing union.

In one or more embodiments, a top opening 105 in the valve body 101 may be closed by a removable cap 106 to allow for easy access to internal components of the check valve 100. It is further envisioned that the valve body 101 may have a branding nameplate 107 to easy identify the check valve 100. The branding nameplate 107 may have a slot 108 to insert labels. Further, the branding nameplate 107 may include an arrow 109 pointing in a direction that identifies a flow direction from the inlet end 102 to the outlet end 103 of the check valve 100.

Figure 2B:
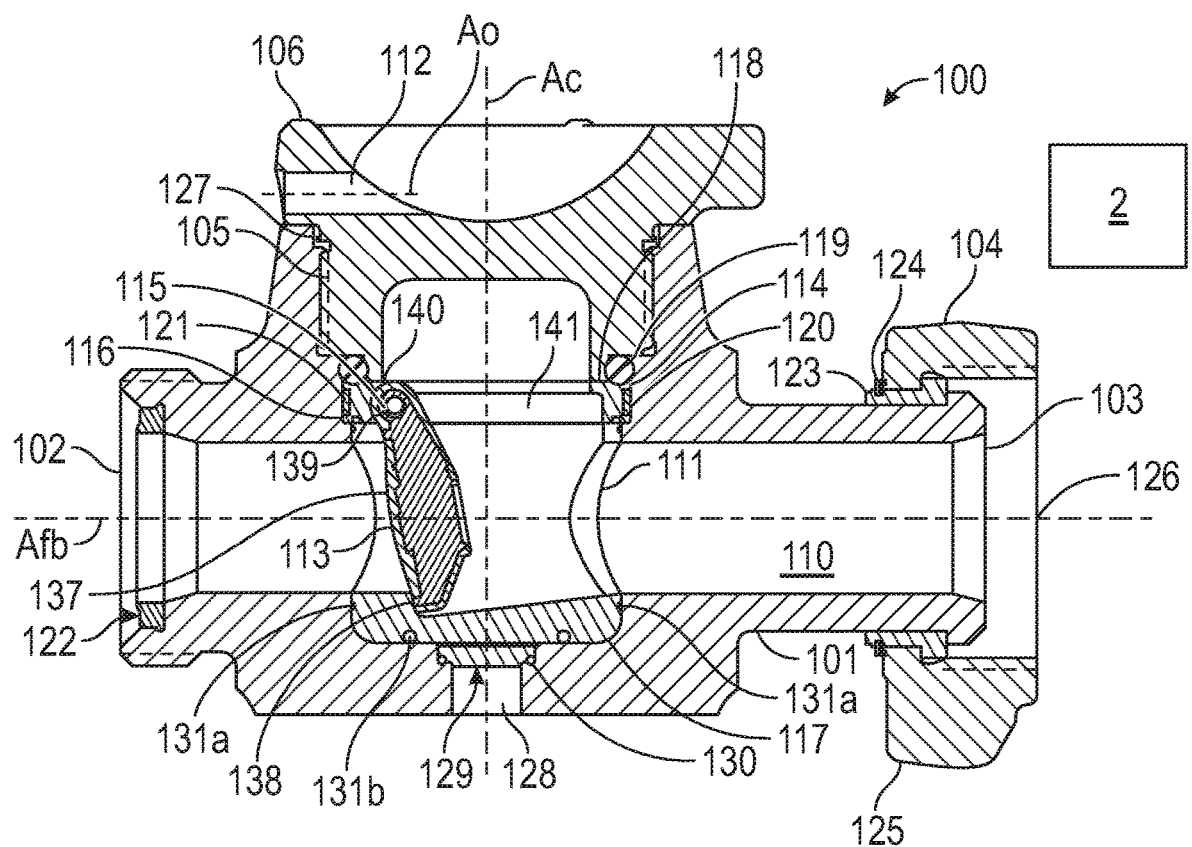
FIG. 2B is a longitudinal cross sectional view of the check valve of FIG. 2A in accordance with one or more embodiments of the present disclosure.

Referring to FIG. 2B, FIG. 2B shows a longitudinal cross sectional view, along plane 2 in FIG. 2A, of the check valve 100 in accordance with one or more embodiments of the present disclosure. The valve body 101 may include at least one generally tubular flow bore 110 extending from the inlet end 102 to the outlet end 103 located internally within the valve body 101. Additionally, a seal ring 122 may be provided within the inlet end 102. At the outlet end 103, the nut 104 may be attached to the valve body 101 via a retainer nut 123 and an external nut seal 124. Further, the nut 104 may have lugs 125 to allow for easy installation. The nut 104 may have threads 126 for coupling to various piping and tubing components.

In one or more embodiments, a cavity 111 in the valve body 101 may intersect the flow bore 110. In one or more embodiments, the cavity 111 may have a cylindrical configuration with an axis Ac oriented perpendicular to an axis Afb of the flow bore 110. In a non-limiting example, when the flow bore 110 is oriented horizontally, the axis of the cavity 111 is oriented vertically. Further, the cavity 111 may be accessible through the top opening 105. Further, the removable cap 106 may be threaded onto threads on a surface of the top opening 105. One skilled in the art will appreciate how the threads on the removable cap 106 and the surface of the top opening 105 may be any type of threads, such as ACME threads, API threads, or specialty threads. A seal 127 may be provided at an uppermost position where the removable cap 106 contacts the valve body 101. It is further envisioned that the removable cap 106 may have a fluid outlet 112 which may allow for excess fluids, such as rainwater, to exit the cavity 111. Additionally, the fluid outlet 112 may have an axis Ao parallel to the axis Afb of the flow bore 110.

In some embodiments, the check valve 100 may include a flapper 113 that is pivotally connected to a retainer ring 114, such as halo, by a pivot pin 115. In FIG. 2B, the flapper 113 is shown in a closed position. The flapper 113 may include a sealing side 137 to seal against a shoulder 138 of a seat cartridge 117. In a non-limiting example, the sealing side 137 may be coated with a resilient material, such as a urethane to enhance the sealing ability of the flapper 113. Additionally, the flapper 113 may have a hinge portion 139 which is positioned in a recess 140 in the retainer ring 114. The hinge portion 139 may have a through bore which is aligned with a pair of spaced apart coaxial holes in the retainer ring 114, and the pivot pin 115 may be inserted through the bore and the holes in order to pivotally connect the flapper 113 to the retainer ring 114. In an open position, the flapper 113 may rotate about the pivot pin 115 to be displaced from the shoulder 138. In a non-limiting example, the flapper 113 may open to be within an inner slot 141 of the retainer ring 114.

In one or more embodiments, the retainer ring 114 may be inserted in a reduced diameter pocket 116 in the top opening 105. In a non-limiting example, the retainer ring 114 may be made of an elastomeric or metal material, such as a suitable urethane, polyurethane, or stainless steel, and functions to seal internal pressure within the check valve 100. The pivot pin 115 may also be made of an elastomeric or metal material, such as a suitable urethane, polyurethane, or stainless steel. In addition, the retainer ring 114 may be supported on a seat cartridge 117 which is positioned coaxially in the cavity 111. The seat cartridge 117 may be inserted through the top opening 105 and slidably received in the cavity 111. A bottom rim portion 118 of the removable cap 106 secures the retainer ring 114 in position against the seat cartridge 117. Further, a body cap seal 119 may be adjacent to the bottom rim portion 118 to seal on top of the retainer ring 114. O-rings 120 may be placed between the retainer ring 114 and the seat cartridge 117. It is further envisioned that the valve body 101 may have a bottom opening 128 opposite the top opening 105. The bottom opening 128 may be closed with a body plug 129 adjacent to the seat cartridge 117. Further, one or more O-rings 130 may be inserted between the body plug 129 and the valve body 101. Furthermore, different size O-rings 131a, 131b may be inserted between the seat cartridge 117 and the valve body 101 near the bottom opening 128.

Still referring to FIG. 2B, in one or more embodiments, a pivot pin retainer seal 121 (as described in FIGS. 4A-4B) may be provided between the retainer ring 114 and the valve body 101. In a non-limiting example, the retainer ring 114 may include an outer slot (as described in FIG. 3B) for the pivot pin retainer seal 121 to be inserted. In this manner, the retainer ring 114 forms a pressure-tight seal between the cavity 111 and the external environment. In a non-limiting example, the pivot pin retainer seal 121 may be made of an elastomeric material, such as a suitable urethane or polyurethane, and functions to seal flow around the retainer ring 114 to avoid erosion and materials such as sand being lodged between the retainer ring 114 and other components. Additionally, a pliability of the pivot pin retainer seal 121, as compared to the retainer ring 114, may facilitate removal of the retainer ring 114 without the use of specialized tooling to the extent sand or other materials do become lodged between the retainer ring 114 and the other components. In this manner, the use of a pivot pin retainer seal 121 made of a pliant material, such as urethane or polyurethane, may facilitate the use of a more robust material, such as stainless steel, for the retainer ring 114, such that it may better withstand erosion due to sand or particular flow through the valve.

Figure 2C:
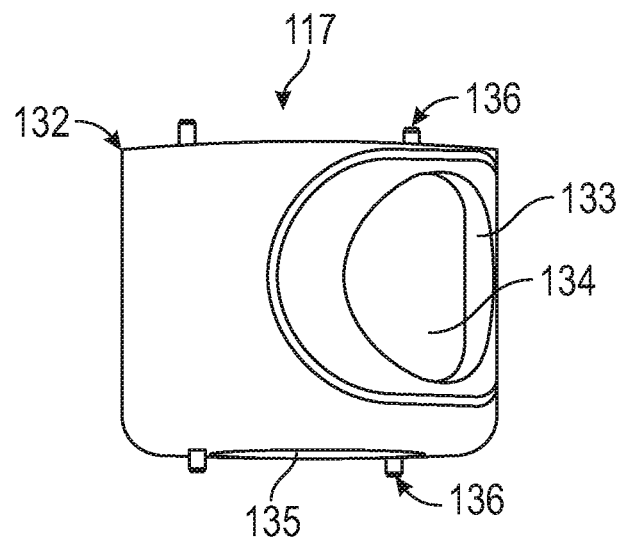
FIG. 2C is a side view of a seat cartridge of the check valve of FIG. 2B in accordance with one or more embodiments of the present disclosure.

Now referring to FIG. 2C, a side view of the seat cartridge 117 is shown in accordance with one or more embodiments of the present disclosure. The seat cartridge 117 may have a body 132 with a configuration corresponding with the cavity (see 111 in FIG. 2B) and have an upper opening 133 aligned with the retainer ring (see 114 in FIG. 2B). Additionally, a chamber 134 may be formed within the body 132 to accommodate the flapper (see 113 in FIG. 2B). Further, the body 132 may include a bore 135 to allow fluids to flow through the seat cartridge 117 from the inlet end (see 102 in FIG. 2B) to the outlet end (see 103 in FIG. 2B) of the check valve (see 100 in FIG. 2B). Thus, it may be seen that the seat cartridge 117 defines a fluid pathway between the inlet end (102) and the outlet end (103) in the flow bore (see 110 in FIG. 2B), and that the flapper (113) is pivotable through the fluid pathway into a closed position to thereby prevent fluid from flowing from the outlet end (103) to the inlet end (102) through the seat cartridge 117.

In one or more embodiments, the body 132 of the seat cartridge 117 may have one or more pins 136 that may be inserted in holes of the valve body (see 101 in FIG. 2B) to further secure the seat cartridge 117 within the cavity (111). While it is noted that four pins are shown, this is merely for example purposes only and any number of pins may be used without departing from the scope of embodiments herein. The one or more pins 136 may be alignment pins. In a non-limiting example, the one or more pins 136 may ensure that the upper opening 133 and the bore 135 of the seat cartridge 117 are aligned with the retainer ring (114) and the flow bore (110).

Figure 2D:
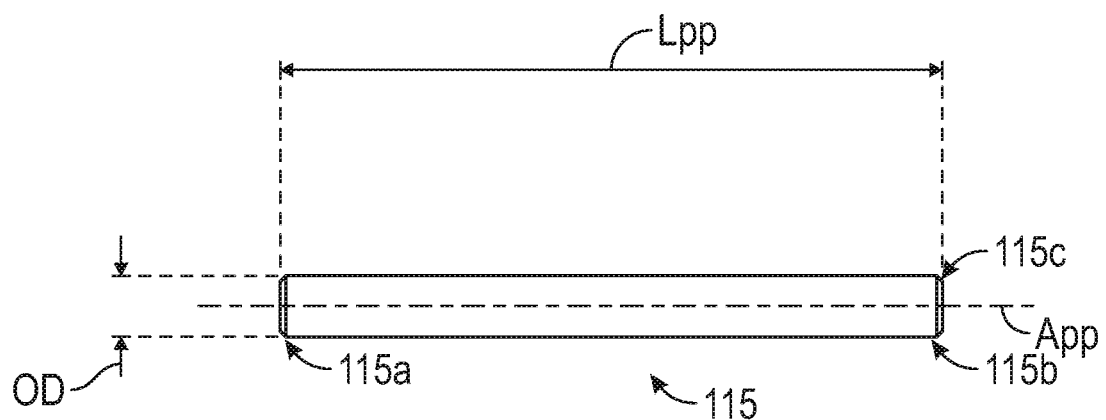
FIG. 2D is a side view of a pivot pin of the check valve of FIG. 2B in accordance with one or more embodiments of the present disclosure.

Now referring to FIG. 2D, a side view of the pivot pin 115 is shown in accordance with one or more embodiments of the present disclosure. The pivot pin 115 may have a cylindrical shape about an axis App. The pivot pin 115 may extend a length Lpp from a first end 115a to a second end 115b. Additionally, an outer dimeter OD of the pivot pin 115 may be constant over the length Lpp. Is it further envisioned that at each of the first and second ends 115a, 115b, an upset 115c may be provided to further secure the pivot pin 115 in the check valve (100).

Figure 3A:
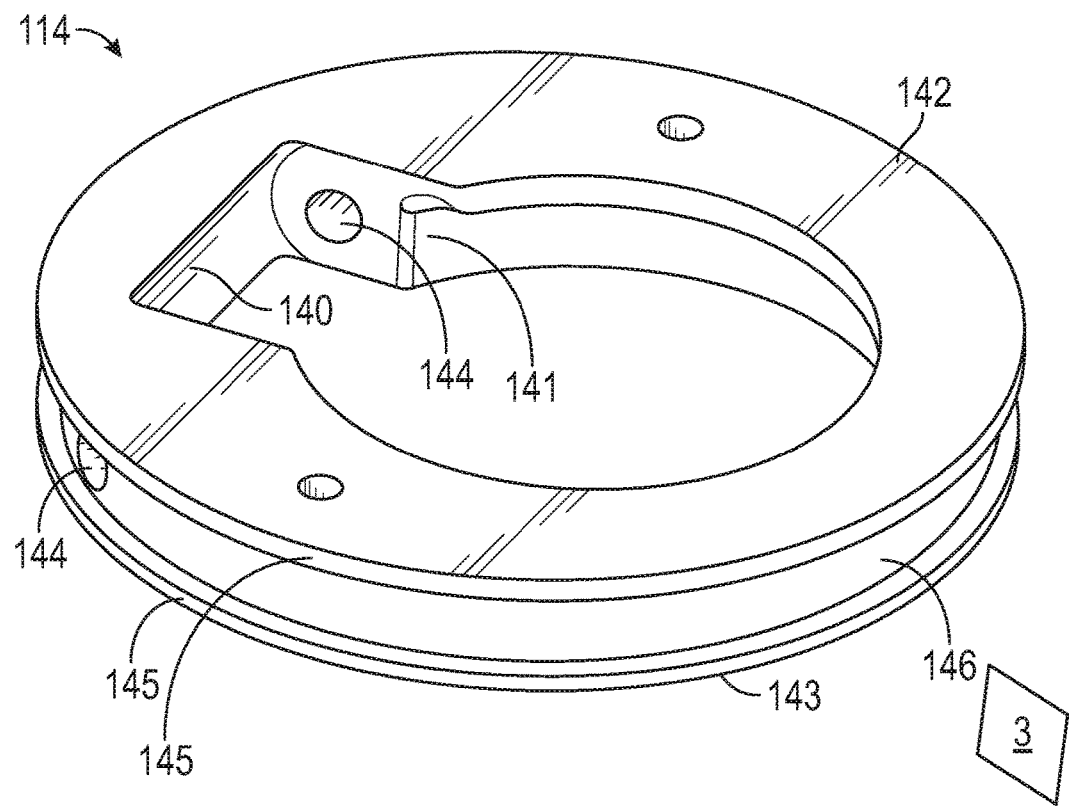
FIG. 3A a perspective view of a retainer ring in the check valve of FIG. 2B in accordance with one or more embodiments of the present disclosure.
Figure 3B:
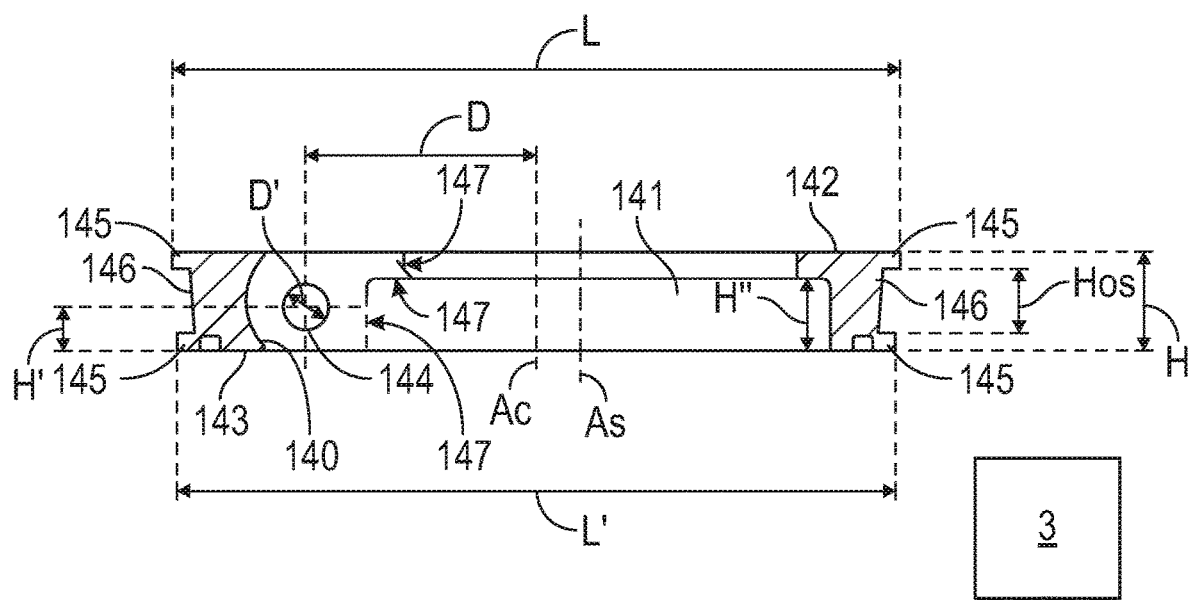
FIG. 3B is a cross sectional view of the retainer ring of FIG. 3A in accordance with one or more embodiments of the present disclosure.

Referring to FIGS. 3A and 3B, FIG. 3A shows a perspective view of the retainer ring 114 in the check valve 100 of FIG. 2B in accordance with one or more embodiments of the present disclosure. FIG. 3B shows a longitudinal cross sectional view, along plane 3 in FIG. 3A, of the retainer ring 114 in accordance with one or more embodiments of the present disclosure. In one or more embodiments, a top surface 142 of the retainer ring 114 has a length L that may be longer than a length L' of a bottom surface 143 of the retainer ring 114. By having the change in length (L to L') from the top surface to the bottom surface 143, the retainer ring 114 may be tapered to correspond with a profile of the reduced diameter pocket (see 116 in FIG. 2B) in the top opening (see 105 in FIG. 2B). Additionally, the retainer ring 114 may have a height H extending from the bottom surface 143 to the top surface 142. Further, the retainer ring 114 may have an outer slot 146 to receive the pivot pin retainer seal (see 121 in FIG. 2B). A height Hos of the outer slot 146 may be delimited by end ledges 145 of the top surface 142 and the bottom surface 143 such that the height Hc less the height H of the retainer ring 114.

In one or more embodiments, the retainer ring 114 may have coaxial holes 144 spaced a distance D from the axis AC of the cavity (see 111 in FIG. 2B) and a height H' from the bottom surface 143 of the retainer ring 114. The coaxial holes 144 may have a diameter D' larger than an outer diameter of the pivot pin (see 115 in FIGS. 2B and 2D). In this manner, the flapper (see 113 in FIG. 2B) may easily move around the pivot pin (115) and seal at low pressures. Further, the inner slot 141 of the retainer ring 114 may have an axis As that is offset from the axis Ac of the cavity (111) such that the inner slot 141 receives the flapper (113). The inner slot 141 may have a height H" to give enough clearance to fit the flapper (113). It is further envisioned that an inner surface 147 of the inner slot 141 may be cast to have profile matching a surface of the flapper (113). Additionally, the inner slot 141 may be delimited by the top surface 142 which may act as an upper top for the flapper (113). In some embodiments, the recess 140 may have a profile shaped to match the hinge portion (see 139 in FIG. 2B) of the flapper (113).

Figure 4A:
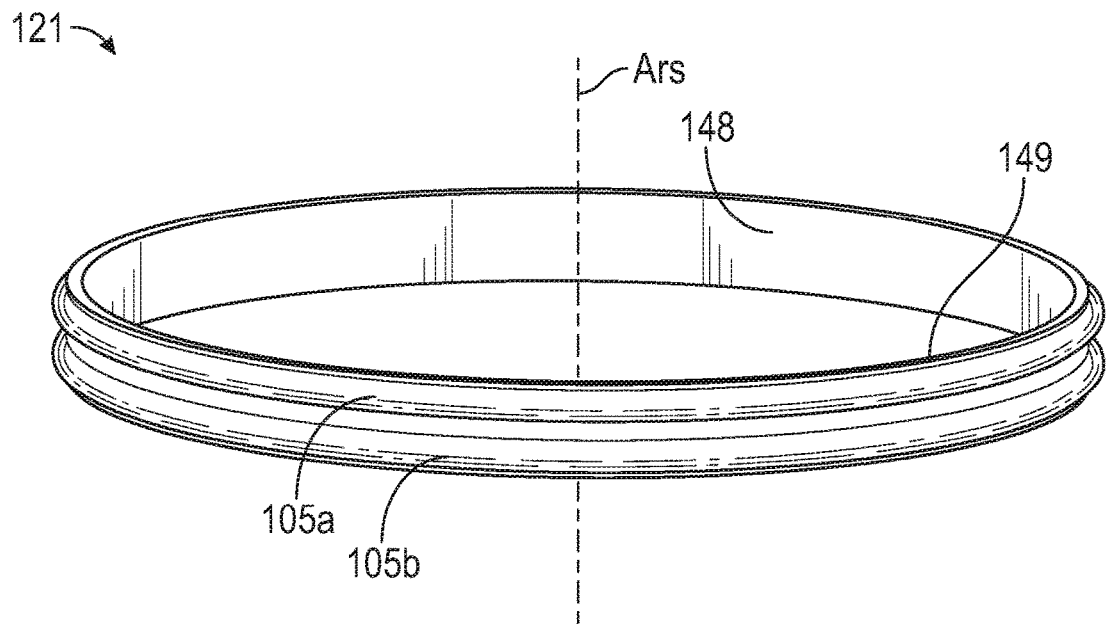
FIG. 4A is a perspective view of a pivot pin retainer seal in accordance with one or more embodiments of the present disclosure.

Now referring to FIG. 4A, FIG. 4A shows a perspective view of the pivot pin retainer seal 121 in the check valve 100 of FIG. 2B in accordance with one or more embodiments of the present disclosure. The pivot pin retainer seal 121 may have a circular shape with an inner surface 148 and an outer surface 149 to form a ring profile about an axis Ars. The inner surface 148 may be pressed against the outer slot (see 146 in FIG. 3B) and the outer surface 149 may be pressed against the valve body (see 101 in FIG. 2B). The inner surface 148 may be a smooth uniform surface. Additionally, one or more protrusions (150a, 150b) may extend outwardly from the outer surface 149 to seal against the valve body. In a non-limiting example, a first protrusion 150a may be spaced a distance from a second protrusion 150b. While it is noted that only two protrusions are shown, this is shown merely for example purposes only and any number of protrusions may be used without departing from the scope of embodiments herein. It is further envisioned that the each of the first and second protrusions 150a, 150b may have any shape. In a non-limiting example, the first and second protrusions 150a, 150b may be rounded to have a profile shaped in a shape of a semi-circle.

Figure 4B:
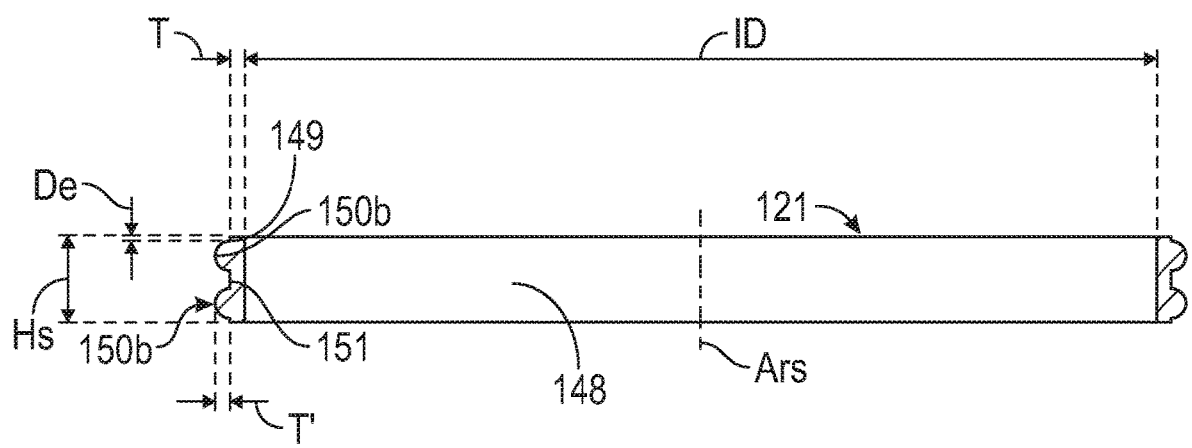
FIG. 4B is a cross sectional view of the pivot pin retainer seal in FIG. 4A in accordance with one or more embodiments of the present disclosure

Referring to FIG. 4B, FIG. 4B shows a longitudinal cross sectional view, along the axis Ars in FIG. 4A, of the pivot pin retainer seal 121 in accordance with one or more embodiments of the present disclosure. As shown in FIG. 4B, the pivot pin retainer seal 121 may have an inner diameter ID spanning across the inner surface 148. The pivot pin retainer seal 121 may have a thickness T measured from the inner surface 148 to the outer surface 149. The inner diameter ID added with the thickness T may equal an outer diameter of the pivot pin retainer seal 121. Additionally, the first protrusion 150a and the second protrusion 150b extend from the outer surface 149 a thickness T' in radial direction from the axis Ars. The thickness T' of each the first and second protrusions 150a, 150b may be less than the thickness T of the pivot pin retainer seal 121. However, the thickness T' of each the first and second protrusions 150a, 150b may also be more than or equal to the thickness T of the pivot pin retainer seal 121. It is further envisioned that the thickness T' of each the first and second protrusions 150a, 150b may be equal to or different from each other. Further, the first and second protrusions 150a, 150b may be spaced across a height Hs of the pivot pin retainer seal 121. In a non-limiting example, each of the first and second protrusions 150a, 150b may be spaced from an edge of the pivot pin retainer seal 121 a distance De such that a gap 151 between the first and second protrusions 150a, 150b is larger than the distance De.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A check valve comprising:
   a valve body which includes an inlet end, an outlet end, a flow bore that extends between the inlet and outlet ends, a cavity which intersects the flow bore, and an opening which is connected to the cavity;
   a cap removably secured in the opening;
   a seat cartridge disposed in the cavity, wherein the seat cartridge comprises a chamber with a flow bore;
   a retainer ring positioned in the valve body between the cap and the seat cartridge, wherein the retainer ring comprises an outer slot having a taper with a non-zero slope;
   a pivot pin retainer seal disposed within the outer slot, wherein the pivot pin retainer seal comprises at least two protrusions extending outwardly in a radial direction from the retainer ring to seal on the valve body, wherein the at least two protrusions are spaced a distance from each other on an outer surface of the pivot pin retainer seal;
   a flapper pivotally connected to the retainer ring, wherein the flapper is pivotable through the chamber between a closed position in which the flapper is positioned against a shoulder in the seat cartridge and an open position in which the flapper is displaced from the shoulder.

2. The check valve of claim 1, wherein each of the protrusions has a profile in a shape of semi-circle.

3. The check valve of claim 1, wherein the pivot pin retainer seal is made from an elastomer material.

4. The check valve of claim 3, wherein the retainer ring is made from a metal or an elastomer material.

5. The check valve of claim 1, wherein the retainer ring comprises an inner slot to receive the flapper.

6. The check valve of claim 1, wherein the seat cartridge comprises one or more pins configured to insert in corresponding holes in the valve body.

7. The check valve of claim 1, wherein the flapper comprises a sealing side coated with a resilient material.

8. The check valve of claim 1, wherein the flapper comprises a hinge portion received in a recess in the retainer ring, and wherein a pivot pin is positioned in a bore which extends through the hinge portion and into a corresponding hole of the retainer ring to thereby pivotally secure the flapper to the retainer ring.

9. The check valve of claim 1, wherein the seat cartridge is configured to be slidably disposed within the cavity through the opening.

10. The check valve of claim 1, wherein a top surface of the retainer ring has a length longer than a length of a bottom surface of the retainer ring.

11. The check valve of claim 10, wherein the outer slot is delimited by end ledges of the top surface and the bottom surface.

12. The check valve of claim 1, wherein an inner surface of the pivot pin retainer seal is a smooth uniform surface pressed against the outer slot.

13. A method for assembling a check valve, the method comprising:
    inserting a seat cartridge through an opening of a valve body of the check valve;
    slidably receiving the seat cartridge in a cavity intersecting a flow bore of the valve body;
    providing a retainer ring and pivotally connecting a flapper to the retainer ring;
    providing a pivot pin retainer seal on the retainer ring by inserting the pivot pin retainer seal in an outer slot of the retainer ring, wherein the outer slot is tapered to have a non-zero slope, and wherein the pivot pin retainer seal comprises at least two protrusions spaced a distance from each other on an outer surface of the pivot pin retainer seal;
    positioning the retainer ring against an end of the seat cartridge; and
    sealing the retainer ring against the valve body with one or more protrusions of the pivot pin retainer seal.

14. The method of claim 13, wherein the pivotally connecting of the flapper comprises:
    inserting a pivot pin in a hinged portion of the flapper; and
    inserting the pivot pin into corresponding hole in the retainer ring.

15. The method of claim 13, further comprising securing the retainer ring and the seat cartridge in position in the valve body by removably securing a cap in the opening.

16. The method of claim 13, further comprising pressing the at least two radially extending protrusions of the pivot pin retainer seal against the valve body.

17. The method of claim 13, wherein the inserting the pivot pin retainer seal in the outer slot comprises pressing an inner surface of the pivot pin retainer seal against the outer slot, wherein the inner surface is a smooth uniform surface.

* * * * *